United States Patent Office 3,591,393
Patented July 6, 1971

3,591,393
INSULATING FIRE BRICK
Adam Smith Rankine, Martinsville, N.J., assignor to Johns-Manville Corporation, New York, N.Y.
No Drawing. Filed Nov. 4, 1968, Ser. No. 773,293
Int. Cl. C04b 21/06, 43/00
U.S. Cl. 106—67
10 Claims

ABSTRACT OF THE DISCLOSURE

A lightweight insulating refractory composition, or brick thereof, of improved strength characteristics for high temperature service comprising the fired product of kaolin clay, pyrophyllite, grog, and sawdust, containing therein particulate pre-fired mixture of gypsum and kaolin.

BACKGROUND OF THE INVENTION

This invention is concerned with lightweight or porous insulating fire brick or block for medium to high temperature applications, i.e., up to about 2,500° F. service, for either direct exposure or back-up insulation in furnaces, kilns, soaking pits, stress-relieving furnaces, flues, and the like.

SUMMARY OF THE INVENTION

The present invention embodies an insulating fire brick or block product of the above characteristics having improved strength properties which are introduced without detracting from other requirements such as insulating values, etc., and additionally which is more amenable to economical production as evidenced by increased product recovery. The invention embodies inclusion within a generally typical insulating fire brick composition of kaolin clay and pyrophyllite, and typically with sawdust to effect the porous consistency in the fired product, of a pre-fixed mixture of gypsum and kaolin clay in fine particle form. This introduction of particulate pre-fired gypsum and kaolin clay of a lime-alumina-silica constitution significantly enhances strength properties and renders the material more amenable to manufacturing procedures all without any discernible reduction in any other significant respects such as reheat shrinkage, thermal conductivity, etc.

It is the primary object of the invention to provide a new composition for the manufacture of medium to high temperature insulating fire brick and related products of improved strength properties and reduced rejects in manufacture.

DESCRIPTION OF THE PREFERRED EMBODIMENT

This invention is particularly directed to refractory material of a porous, and in turn lightweight structure of densities within the approximate range of 30–55 pounds per cubic foot, produced by firing an admixture in approximate parts by weight of:

| Ingredients | Broad | Preferred |
| --- | --- | --- |
| Kaolin clay | 24–48 | 30–40 |
| Pyrophyllite | 0–42 | 20–25 |
| Grog of same composition after firing | 0–42 | 18–25 |
| Combustible carbonaceous material such as sawdust | 13–26 | 18–24 |

The grog component constitutes scrap derived from fired products of the same composition, such as trim, waste, or broken brick, etc., and, therefore, is of substantially an identical composition as the fired product produced. Grog should be reduced to a relatively fine and substantially uniform particle size of approximately within the range of −6 to −150 mesh and typically about −14 mesh.

Combustible material preferably consists of sawdust and is included to effect cells or small voids upon burning out during firing to provide low density and enhance insulating values. Thus, this component does not affect the ultimate composition and the amount included is effective in determining the density of fired material. Preferred densities for products of this invention are between about 40 and about 50 pounds per cubic foot. However, since the primary function of this composition is simply to form multiple voids or cells throughout the refractory material by initially occupying space within the shape and unfired material and upon burn out leaving a void, other combustible materials of apt size can suffice such as resin, cork, bagasse particles.

This invention constitutes the inclusion within the foegoing admixture, and a resultant composition of the combination therewith, of a pre-fired mixture of gypsum and kaolin with carbonaceous material such as sawdust comprising, in approximate parts by weight: 60 to 75 of kaolin clay, and 20 to 30 of gypsum, with 5 to 20 of sawdust; and providing upon firing a composition of, in approximate percentage by weight: 10–20% of lime, 35–45% of alumina, and 40–50% of silica. Preferred proportions of the gypsum and kaolin clay with sawdust for the pre-fired ingredients comprises, in approximate parts by weight: 65–75 of kaolin clay, 20–30 of gypsum, with 10–15 sawdust. The sawdust and other combustible material is burned out, of course, in pre-firing and simply leaves voids or cells which contribute to the low density and high insulating values of the overall ultimate product. In lieu of the kaolin clay, similar clays such as ball clay, a fire clay, or any comparable source of aluminum silicate can be substituted.

This particulate pre-fired mixture of gypsum and kaolin, which should be reduced to relatively fine and substantially unifom particles size as within the approximate range of −4 to −100 mesh and typically about −16 mesh, is included in the basic insulating refractory admixture in amounts of about 4 to about 20 parts by weight, and preferably amounts of about 5 to about 15 parts by weight.

The lightweight insulating refractory product, such as brick or block, of this invention is produced by conventional procedures comprising, for example unifomly admixing the given ingredients comprising the unfired kaolin clay, pyrophyllite, sawdust, and grog derived from waste, etc., of the same product, and including theren the pre-fired mixture of gypsum and kaolin clay with sawdust, together with sufficient water to provide a moldable shape-retaining consistency, shaping the brick or block or the like product, then firing the thus prepared bodies. Firing temperatures are of at least about 2,000° F. or greater, depending upon the composition and the product desired, but preferably about 2,500° F. Kiln firing conditions of the products of this invention, as in the case of the mixing procedures, are typical for this type of insulating fire brick.

The products of this invention can, of course, be formed in any desired or appropriate shapes or sizes including in addition to standard dimension brick, slabs or block for use as such or subsequent cutting into smaller units or configuration. In any case, the composition of the products of this invention exhibits superior strength properties for insulating fire brick of this type and in particular in their modulus of rupture or transverse strength as will be demonstrated hereinafter.

The following comprises specific and preferred examples illustrating the compositions of this invention for insulating fire brick and related products of improved strength properties and demonstrate their superiority over

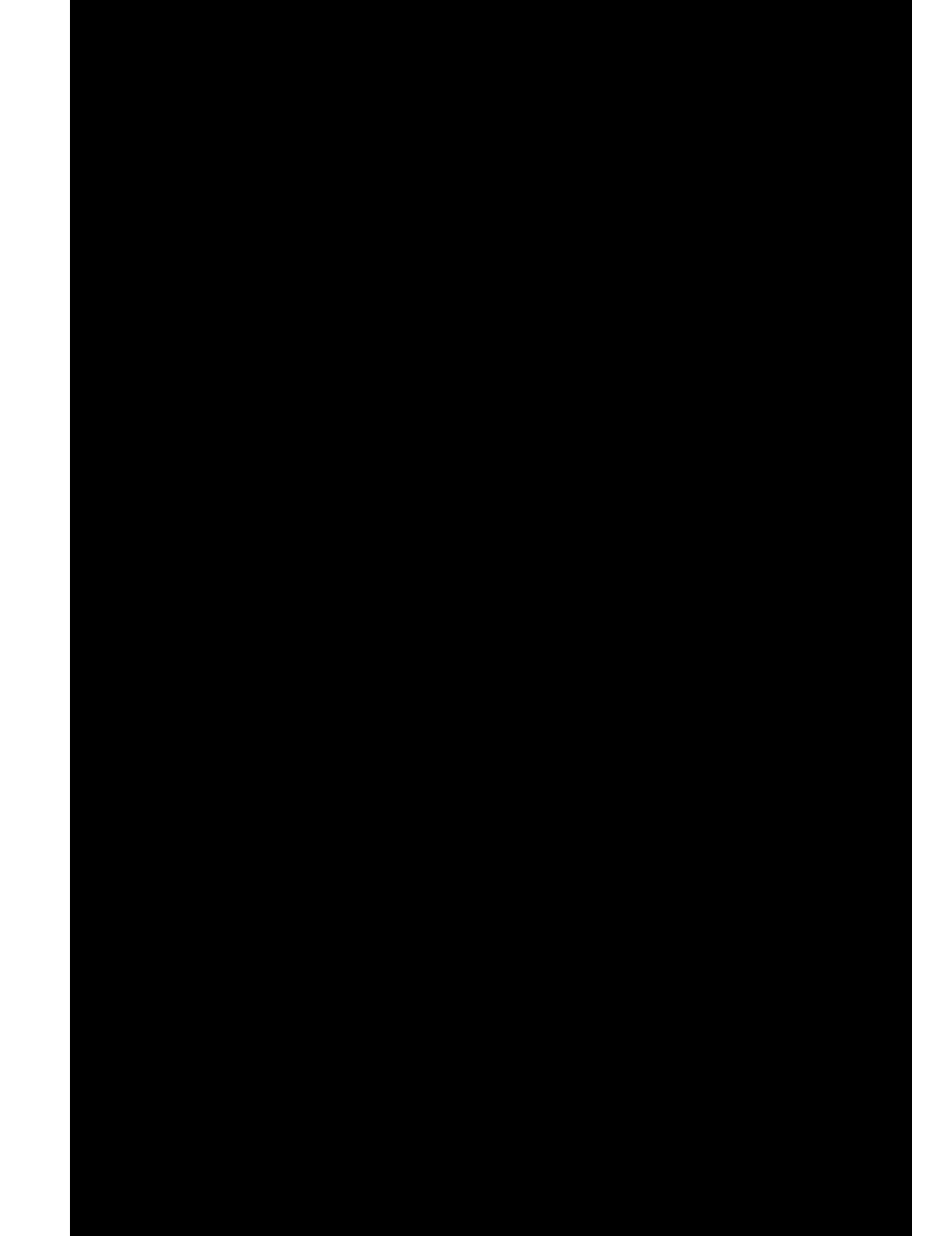

8. The fired, lightweight insulating refractory composition of claim 7, having been fired to a temperature of approximately 2,500° F.

9. The fired, lightweight insulating refractory composition of claim 4, composed of the fired product of an admixture consisting essentially, in approximate parts by weight, of:

| | |
|---|---|
| Kaolin clay | 40 |
| Pyrophyllite | 25 |
| Grog | 25 |
| Sawdust | 25 | and containing dispersed therethrough in amount of approximately 5 to 15 parts by weight of particulate pre-fired mixture, in approximate parts by weight, of 20 to 30 parts of gypsum, 60 to 75 parts of kaolin and 5 to 20 parts of sawdust.

10. The fired, light insulating refractory composition of claim 9, wherein the pre-fired mixture of gypsum, kaolin and sawdust has a fired composition comprising in approximate percentage weight of 16% of lime, 39% of alumina, and 45% of silica.

References Cited

UNITED STATES PATENTS

| | | | |
|---|---|---|---|
| 2,433,430 | 12/1947 | Charles | 106—41 |
| 2,499,229 | 2/1950 | Rankine | 106—41 |

JAMES E. POER, Primary Examiner

U.S. Cl. X.R.

106—41, 63; 252—62